(12) United States Patent
Kim et al.

(10) Patent No.: US 8,171,171 B2
(45) Date of Patent: May 1, 2012

(54) DATA SYNCHRONIZATION METHOD AND SYSTEM BETWEEN DEVICES

(75) Inventors: Jung Hun Kim, Busan Metropolitan (KR); Chang Hee Lee, Seoul (KR); Gwan Gyun Kang, Yongin-si (KR)

(73) Assignees: Samsung Electronics Co., Ltd, Suwon-si (KR); MobileLeader Co., Ltd, Seocho-dong (KR)

( * ) Notice: Subject to any disclaimer, the term of this patent is extended or adjusted under 35 U.S.C. 154(b) by 275 days.

(21) Appl. No.: 12/363,200

(22) Filed: Jan. 30, 2009

(65) Prior Publication Data

US 2009/0198772 A1      Aug. 6, 2009

(30) Foreign Application Priority Data

Jan. 31, 2008 (KR) .................... 10-2008-0010061

(51) Int. Cl.
*G06F 15/16* (2006.01)
(52) U.S. Cl. .................. 709/248; 707/610
(58) Field of Classification Search .......... 707/204, 707/999.4, 999.201; 709/253, 248; 370/503
See application file for complete search history.

(56) References Cited

U.S. PATENT DOCUMENTS

| | | | |
|---|---|---|---|
| 5,870,759 A * | 2/1999 | Bauer et al. ............. | 707/999.004 |
| 7,024,428 B1 | 4/2006 | Huang et al. | |
| 7,509,350 B2 * | 3/2009 | Linkert et al. ......... | 707/999.201 |
| 7,523,146 B2 * | 4/2009 | Holt et al. ............... | 707/999.2 |
| 7,738,503 B2 * | 6/2010 | Goyal et al. ............. | 370/503 |
| 2004/0044799 A1 * | 3/2004 | Sivaraman et al. ........ | 709/253 |
| 2005/0203905 A1 | 9/2005 | Jung et al. | |
| 2006/0200596 A1 | 9/2006 | So | |
| 2007/0271317 A1 * | 11/2007 | Carmel ..................... | 707/204 |
| 2009/0164667 A1 * | 6/2009 | Zhang et al. ............. | 709/248 |

FOREIGN PATENT DOCUMENTS

WO     2006/047650 A2     5/2006

OTHER PUBLICATIONS

"SyngML Sync Protocol, Version 1.1", SyncML, Feb. 15, 2002, vol. 1.1.

\* cited by examiner

*Primary Examiner* — Dustin Nguyen
(74) *Attorney, Agent, or Firm* — Jefferson IP Law, LLP

(57) ABSTRACT

A data synchronization method for more than three networked devices including at least one client and one server for efficiently synchronizing data among multiple devices supporting a Synchronization Markup Language (SyncML) protocol is provided. The data synchronization method includes determining whether a data item indicated by synchronization information contained in a synchronization request message exists in a change log table of the server, when a server receives the synchronization request message sent by a first client, and updating the change log table by adding the data item indicated by the synchronization information and transmitting a synchronization request message containing a data identifier and the change log of the data item to a second client, if a data item indicated by the synchronization information does not exist, otherwise, ending data synchronization by transmitting a synchronization response message containing status information to the first client.

18 Claims, 18 Drawing Sheets

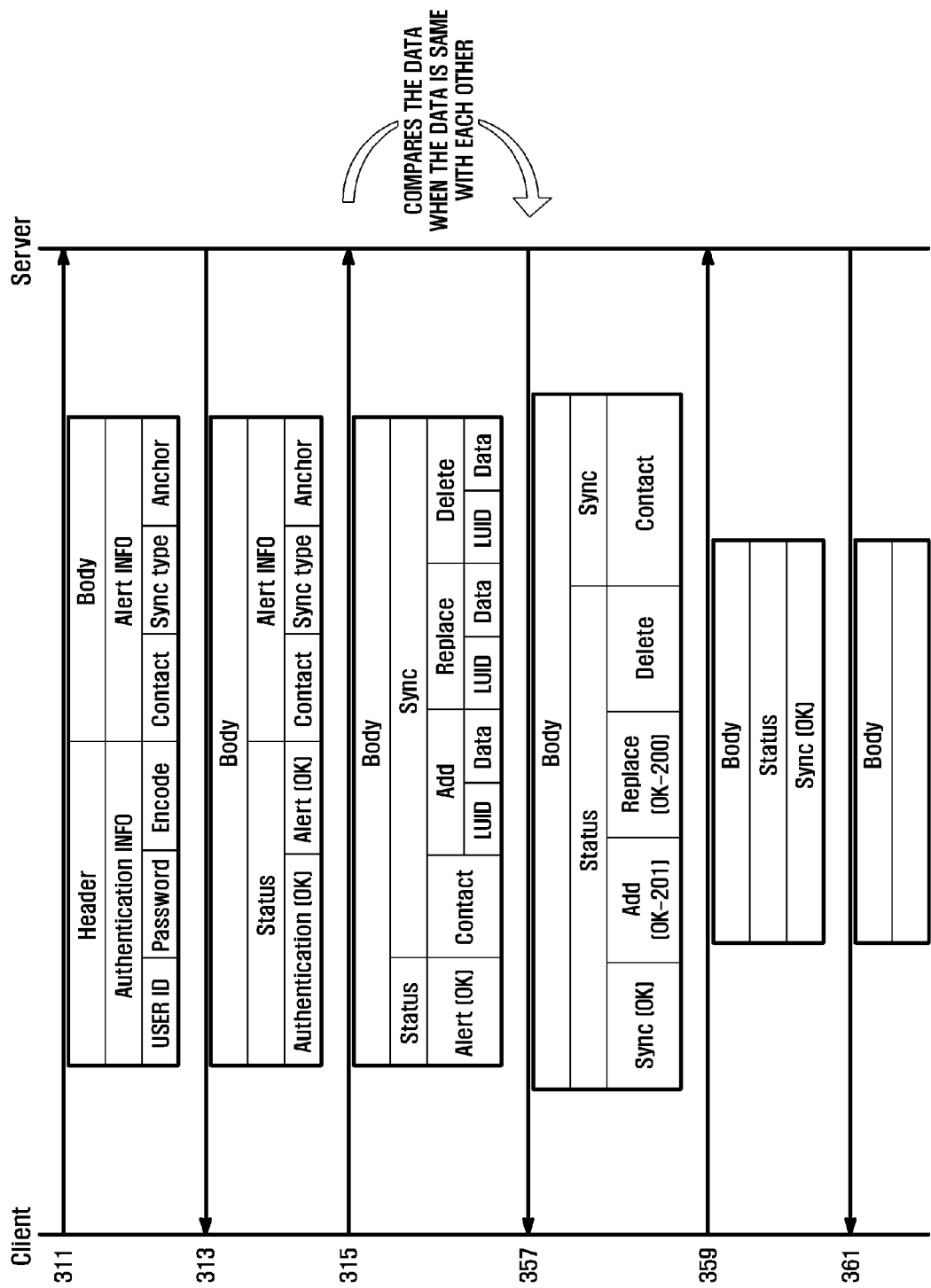

DATA SYNCHRONIZATION METHOD AND SYSTEM BETWEEN DEVICES

PRIORITY

This application claims the benefit under 35 U.S.C. §119(a) of a Korean patent application filed on Jan. 31, 2008 in the Korean Intellectual Property Office and assigned Serial No. 10-2008-0010061, the entire disclosure of which is hereby incorporated by reference.

BACKGROUND OF THE INVENTION

1. Field of the Invention

The present invention relates to a data synchronization method. More particularly, the present invention relates to a method for synchronizing data among multiple devices supporting a Synchronization Markup Language (SyncML) protocol.

2. Description of the Related Art

With the advance of wireless communication technologies and an increase in popularity of mobile devices, various mobile services are developed and provided. Mobile users are not always connected to a network and the network stored data. Therefore, mobile users retrieve data from the network and store the data on the mobile device, where a local copy of the data can be accessed and manipulated. Periodically, users connect to the network to send local changes to a networked data repository and download updates made to the networked data while the mobile devices are disconnected to maintain data synchronization. Data synchronization is the process of making two sets of data become identical to apply the modification of one set of data to the other set of data.

Today, a variety of non-interoperable data synchronization technologies are offered, each connecting data from a few types of data repositories to a few devices. That is, most data synchronization technologies use different communication protocols over the network. Such proliferation of non-interoperable synchronization technologies restricts users' data accessibility and limits the delivery of mobile data services. For this reason, there has been a need for a standardized common data synchronization protocol.

SyncML (Synchronization Markup Language) is a platform-independent information synchronization standard protocol supported by major technology companies. SyncML is an Extensible Markup Language (XML) based open standard protocol for universal synchronization of data between devices, networks and platforms. The SyncML is also one of the most important parts in the development of 3rd Generation (3G) mobile communication systems. SyncML may be used for synchronizing data between computers and between mobile devices as well as between some type of mobile device and a computer.

SyncML may be implemented in the form of a client/server-oriented protocol. In this case, the client may be a mobile device such as a portable computer, a mobile phone and a Personal Digital Assistant (PDA) that are generating data to be synchronized. When generating specific data, the client transmits a synchronization-related message to the server. The server may be a desktop computer or a network server which receives the data from the client and implements synchronization logic.

Here, the data synchronization is a technology to ensure data integrity between two devices. The synchronization technology allows the two devices to maintain identically shared data by applying the modification to the other device, even when a set of data stored to one of the devices is changed (added, modified and deleted). Such synchronization technologies have been developed to synchronize the data between two devices. Accordingly, when more than two devices' data are required to be synchronized, conventional synchronization technologies may incur an infinite synchronization loop problem.

Assuming that three devices A, B and C are involved in data synchronization and device A detects the addition of data "G", the device A transmits the modified data "G" to device B and device C. Upon receipt of the data "G", the device B transmits the data "G" to the device C, and the device C transmits the data "G" to the device B. If the data "G" is received again during the synchronization with the data "G" received from the device A, the device B and the device C considers the data "G" is modified after its addition and records the modification of the data "G" such that the modification of the data "G" is applied at the next synchronization process. Accordingly, whenever the devices are connected to each other, the devices attempt to update the data "G" repeatedly.

Furthermore in the conventional data synchronization methods, when a large file is required to be synchronized, a data comparison process is performed after the large file is completely received, thereby increasing synchronization latency and network traffic load in addition to the infinite synchronization loop problem.

Therefore, a need exists for a data synchronization method for synchronizing data efficiently between multiple devices and to reduce data transmission amount.

SUMMARY OF THE INVENTION

An aspect of the present invention is to address at least the above-mentioned problems and/or disadvantages and to provide at least the advantages described below. Accordingly, an aspect of the present invention is to provide a data synchronization method for simplifying a data synchronization process between more than two devices, and minimizing file transmission latency and traffic load when synchronizing a large file.

Another aspect of the present invention is to provide a data synchronization method for avoiding an infinite synchronization loop problem of identical data between more than two devices by using a data modification map which provides modification history of the data.

In accordance with an aspect of the present invention, a data synchronization method for more than three networked devices including at least one client and server is provided. The data synchronization method includes determining whether a data item indicated by synchronization information contained in a synchronization request message exists in a change log table of the server, when a server receives the synchronization request message sent by a first client, updating the change log table by adding the data item indicated by the synchronization information and transmitting a synchronization request message containing a data identifier and change log of the data item to a second client, if a data item indicated by the synchronization information does not exist, and ending data synchronization by transmitting a synchronization response message containing status information to the first client, if a data item indicated by the synchronization information exists.

In accordance with another aspect of the present invention, a data synchronization method for more than three networked devices including at least one client and server is provided. The data synchronization method includes transmitting a synchronization request message containing synchronization information from the first device to a second device, when a data item is modified at a first device, determining, at the second device, whether the data item indicated by the synchronization information exists in a change log table of the second device, updating the change log table by adding the data item, modifying the synchronization information and transmitting a synchronization request message containing the modified synchronization information to a third device, if the data item does not exist, and ending data synchronization by transmitting a synchronization response message containing status information to the first device, if the data item indicated the synchronization information exists.

In accordance with still another aspect of the present invention, a data synchronization method for networked devices including a first device as a server, a second device as a client and a server, and a third device as a client is provided. The data synchronization method includes transmitting a synchronization request message containing synchronization information associated with modification of the data item from the second device to the first and third devices, when a data item is modified at the second device, updating, at the third device, a change log table reflecting the synchronization information contained in the synchronization request message and transmitting a synchronization response message containing synchronization information with a synchronized data identifier to the first device, and determining, at the first device, whether a data item indicated by the synchronization information received from one of the second device and the third device exists in a change log table of the first device, updating the change log table, if an identical data item does not exist, and ending data synchronization by transmitting a synchronization response message containing synchronization information to the second device.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 5A and 5B are message flow diagrams illustrating a data synchronization procedure between a client and a server according to an exemplary embodiment of the present invention;

Throughout the drawings, it should be noted that like reference numbers are used to depict the same or similar elements, features and structures

DETAILED DESCRIPTION OF EXEMPLARY EMBODIMENTS

Figure 1A:
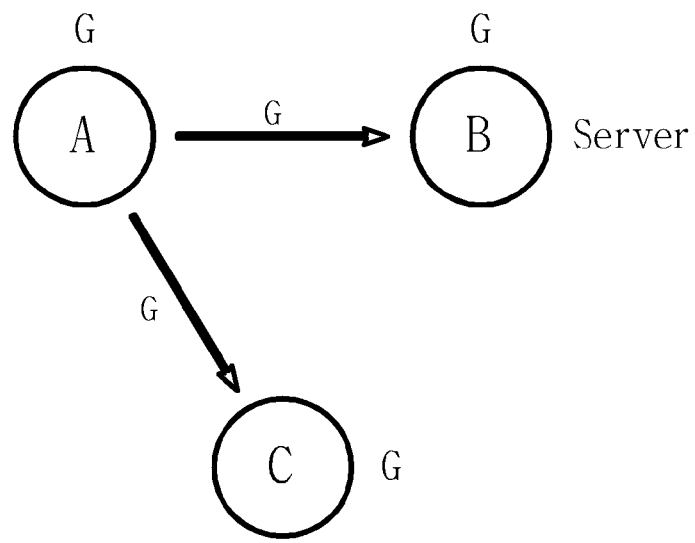
FIGS. 1A to 1C are diagrams illustrating steps of a data addition procedure of a data synchronization method according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following, the term "device" denotes a SyncML-enabled device which may act as either a client or a server. A client is the device that generates modification of data and transmits the modified data to a server, and a server is the device that receives the modified data transmitted by the client and controls synchronization of the data between the client and the server. The term "change log" denotes information on changes of data. Each device tracks changes of respective data between synchronization processes and maintains records of changed data in a database. The term "ID map" denotes mapping IDs assigned to data items of the database of each device. Each device creates, maintains and deletes IDs for managing the modification of the data. The term "anchor" denotes an element indicating a start or an end of a synchronization process. The term "synchronization message" denotes a message that is exchanged between the client and the server for data synchronization. The synchronization message includes of a header and a body. The body of the synchronization message includes status information and/or synchronization information. The status information indicates whether the device is synchronized and includes information regarding the modification and termination of the synchronization and the change log. The synchronization information may include a synchronization command, data identifier (ID) and modified data. The change log contains information indicating a type of modification, e.g., addition, replacement and deletion corresponding to the synchronization commands. The data ID is a unique identifier generated by the device. Locally Unique Identifier (LUID) is the data ID assigned by the client, and Globally Unique Identifier (GUID) is the data ID assigned by the server.

In the following, the synchronization of data between more than three devices is described as an example. The devices may be any type of digital devices operating on a personal computer platform and a web platform. The multi-device data synchronization method allows the user to efficiently manage the data generated at different devices. In an exemplary implementation, the data synchronization method is described with three devices including a server. It is assumed that the three devices include a Personal Computer (PC), a web server and a mobile terminal.

When the data shared by the three devices is modified (i.e., added, replaced or deleted) at one of the devices, the data synchronization method enables the devices to update the data with the modification to maintain most recently updated data.

The data synchronization method is implemented in a client-server mechanism composed of a server that collects data and clients that generate and transmit data. The data synchronization method uses the data ID for identifying data, the change log for indicating modification history of the data and the map for comparing data between more than three devices. In the following description, the PC operates as a server and a client.

Figure 1B:
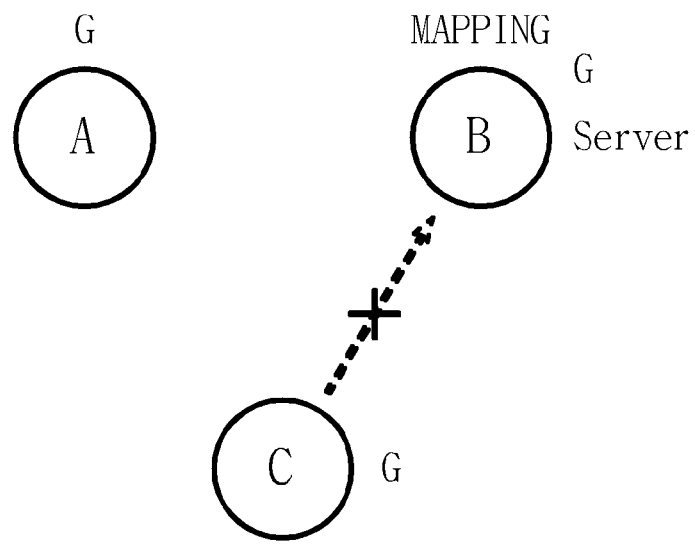
Figure 1C:
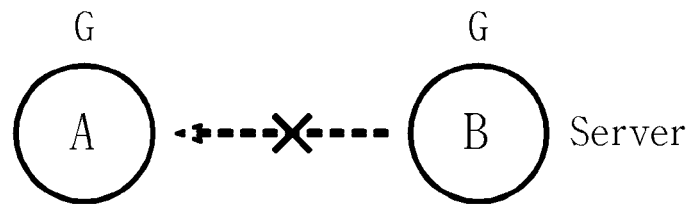

FIGS. 1A to 1C are diagrams illustrating a data addition procedure of a data synchronization method according to an exemplary embodiment of the present invention. In FIGS. 1A to 1C, each of device A and device B may be a client or a client/server, and device C may be a server.

Referring to FIGS. 1A to 1C, when a data "G" is added at the device A, the device A transmits the added data to the device B and the device C together with a change log. Upon receipt of the data item and change log, the device B and the device C adds the data "G" with reference to the change log. Here, the device C transmits information on newly added data "G" to the device B. The device B recognizes that the device C has received the identical data "G" (see FIG. 1B) and maps the information to the data "G" without sending the data "G" to the device A (see FIG. 1C).

As described above, when new data is added at one client, the server looks up its change log and compares the data using a shared ID. If the data indicated by the information transmitted by another client is identical with the newly added data received from the first client, the server creates mapping information to tie the data using an identifier without sending the data to the client. In this manner, the server avoids adding substantially the same data repeatedly, resulting in efficient data synchronization.

Figure 2A:
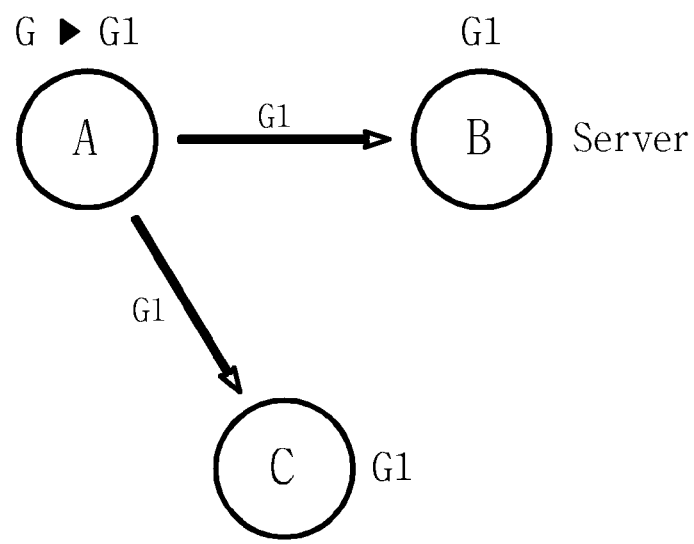
FIGS. 2A to 2C are diagrams illustrating a data replacement procedure of a data synchronization method according to an exemplary embodiment of the present invention.
Figure 2B:
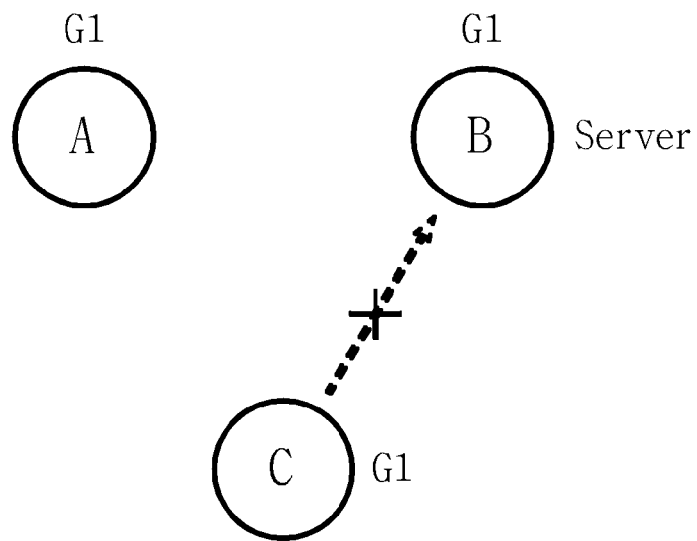
Figure 2C:
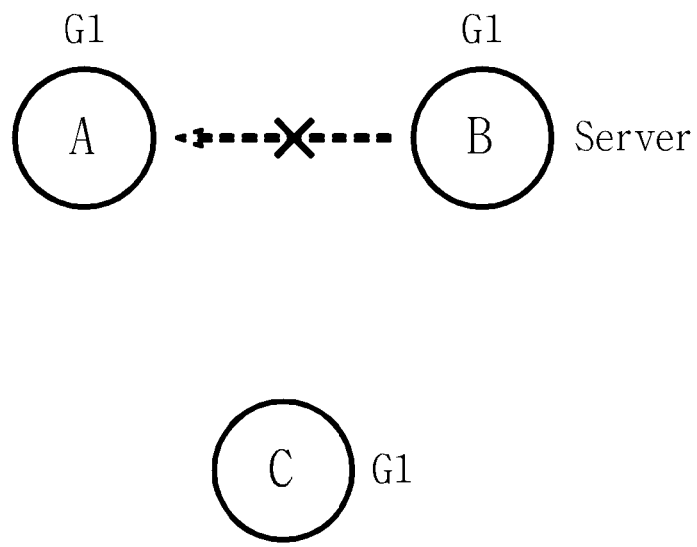

FIGS. 2A to 2C are diagrams illustrating a data replacement procedure of a data synchronization method according to an exemplary embodiment of the present invention. In FIGS. 2A to 2C, the device A and the device B may be a client or a client/server, and device C may be a server.

Referring to FIG. 2A to 2C, when data "G" is replaced by data "G1" at the device A, the device A transmits the data "G1" to second device B and the third device C together with a change log. Upon receipt of the data "G1", the second device B and third device C replaces the data "G" with the data "G1" in the database with reference to the change log. Here, the device C transmits modification information indicating the replacement of data from "G" to "G1" to the device B. The device B recognizes that the device C has received the replaced data "G1" based on the modification information sent by the device C. Accordingly, the information received from the device C is mapped to the data "G1" without sending the data "G1" to the device A.

As described above, when the data shared by more than three devices is modified at one of the devices, the server receives the modified data and compares the original data with the modified data sharing an identical ID with reference to the change log. At this time, the server receives modification information from another device. If the data indicated by the modification information is identical with the modified data, the server creates mapping information without sending the modified data to the client devices. That is, when the currently received data is identical with the most recently updated data, the server ignores the currently received data and does not send the data back to the client.

Figure 3A:
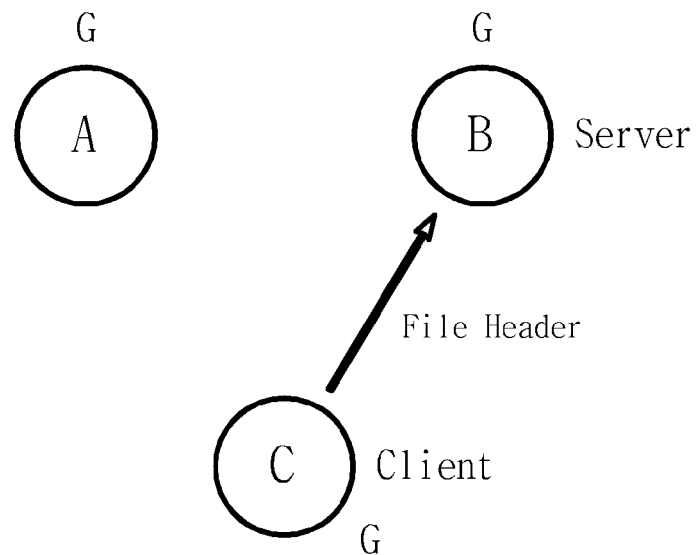
FIGS. 3A to 3C are diagrams illustrating a data addition procedure of a data synchronization method according to an exemplary embodiment of the present invention.
Figure 3B:
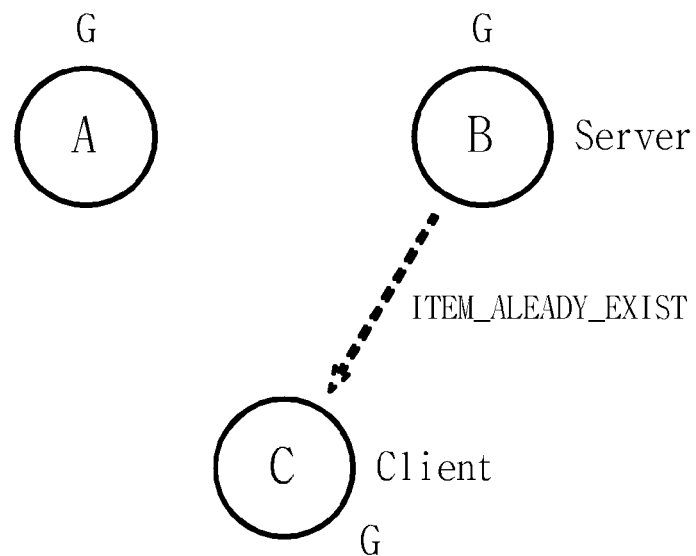
Figure 3C:
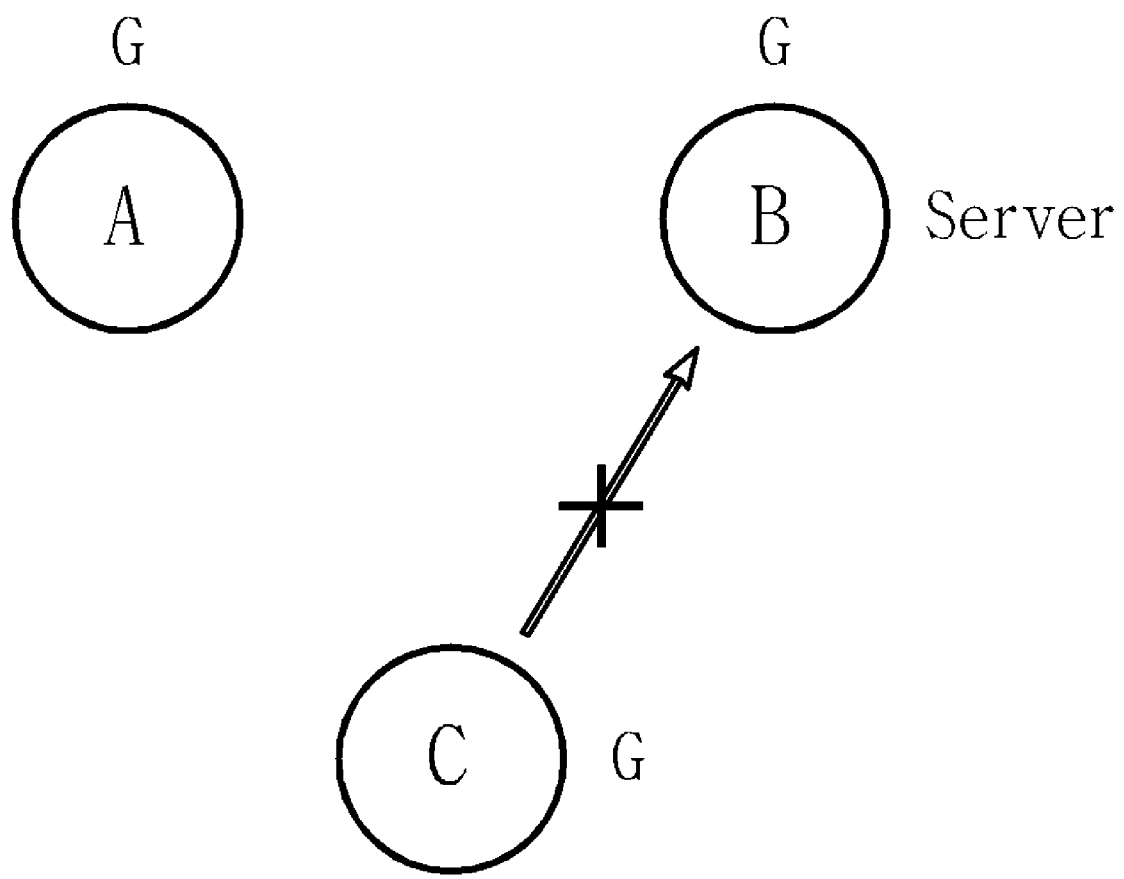

FIGS. 3A to 3C are diagrams illustrating steps of a data addition procedure of a data synchronization method according to an exemplary embodiment of the present invention. In FIGS. 3A to 3C, each of devices A and B may be a client or a client/server, and device C may be a server.

Referring to FIGS. 3A to 3C, if a large file "G" is added in the device C, the device C transmits a header of the file "G" to the device B (see FIG. 3A). Upon receipt of the file header, the device B analyzes the file header and determines whether the file indicated by the file header exists in the database. If the file exists, the device B transmits a message <ITEM_ALREADY_EXIST> to the device C (see FIG. 3B). If the <ITEM_ALREADY_EXIST> message is received, the device C does not send the file. When another modified file exists, the device C transmits the file header to the device B.

As described above, when a large file is added at one of the devices sharing data, the device transmits a file header of the file to the server. The file header includes information, such as a creation time, a file name and a file size. Upon receipt of the file header, the server compares the received file header with file headers of the files stored in the file header storage. If an identical file header is retrieved, the server transmits the message <ITEM_ALREADY_EXIST>, i.e., CODE:206, to the client device. If the client device receives <ITEM_ALREADY_EXIST>, the client device does not send the file represented by the file header. In this manner, when a large file is modified or added at a client, the client transmits the file header instead of the entire file to the server. Accordingly, the server determines whether to receive the file for synchronization depending on the file header comparison result, thereby reducing a data transmission amount.

As described above, the data synchronization method according to an exemplary embodiment of the present invention performs data synchronization in a simplified manner to effectively acquire synchronization of data among more than three devices.

Figure 4:
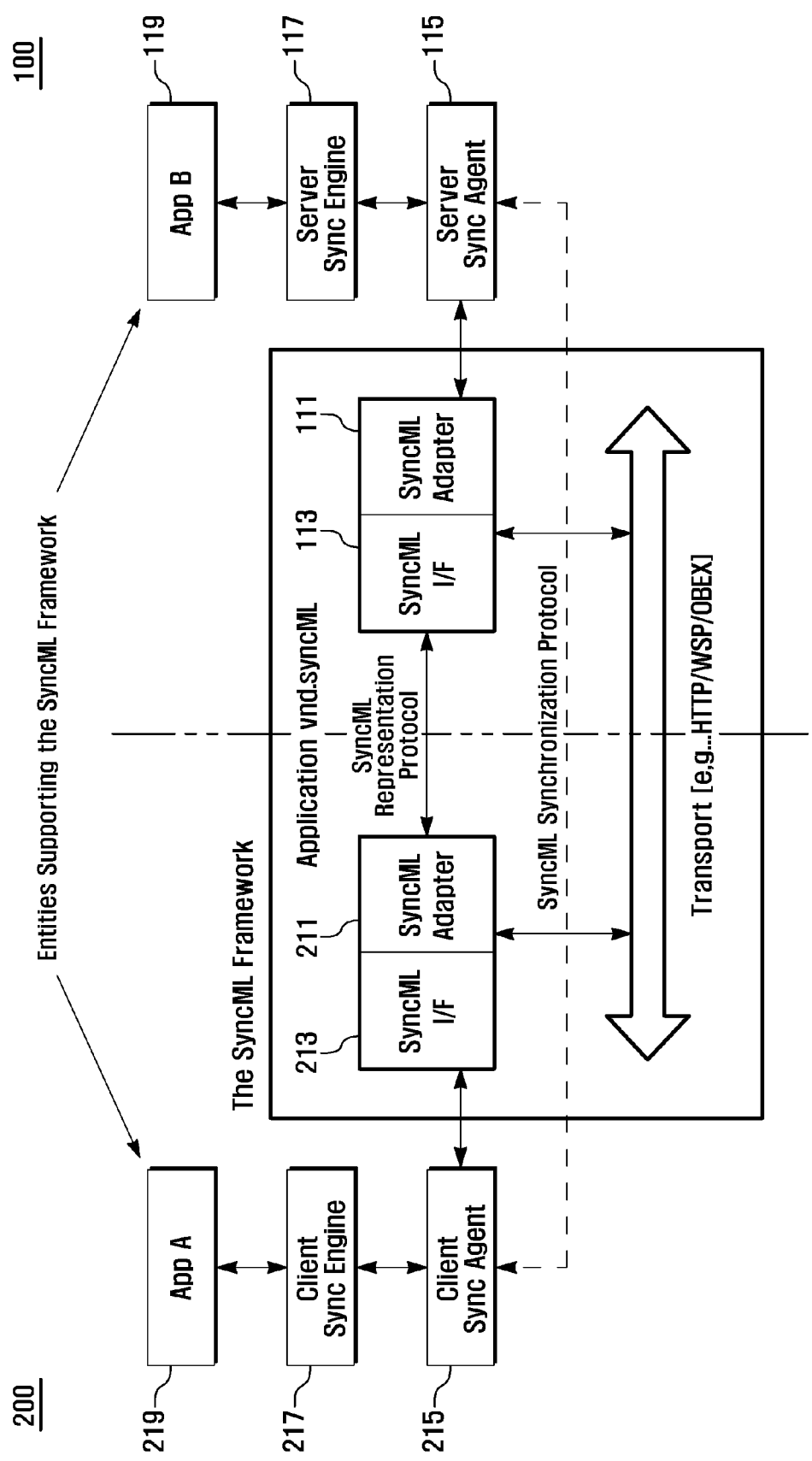
FIG. 4 is a diagram illustrating a SyncML framework for use in a data synchronization method according to an exemplary embodiment of the present invention.

FIG. 4 is a diagram illustrating a SyncML framework for use in a data synchronization method according to an exemplary embodiment of the present invention.

Referring to FIG. 4, a server 100 and a client 200 have an identical structure for supporting the SyncML framework. The SyncML framework of the server (client) consists of a SyncML adaptor 111 (211) and a SyncML interface (SyncML I/) 113 (213). The structures of the SyncML adaptor and interface are implementations for synchronizing data. The server (client) 100 (200) includes a Sync Agent 115 (215), a Sync Engine 117 (217) and an application 119 (219).

The above-structured server 100 and client 200 perform data synchronization process using the SyncML framework and Extended Markup Language (XML). The server 100 and client 200 uses a change log which records the change of data and an ID map which maps IDs of data. The ID map is responsible for maintaining identifiers of data in the databases of the server and the client. The ID map does not have the same ID for different data items. The server 100 and the client 200 create and delete the IDs. More particularly, the server 100 is responsible for implementing and maintaining a client database ID management mechanism with map table implementation. The client 200 is provided with a client database as shown in Table 1, and the server 100 is provided with a server database and server map table as shown in Table 2 and Table 3. In Tables 1 to 3, the Local Unique Identifiers (LUID) assigned to the data items are created by the client 200, and the Global Unique Identifiers (GUID) assigned to the data items are created by the server 100.

TABLE 1

| LUID | Data |
| --- | --- |
| 11 | Data_1 |
| 12 | Data_2 |
| 13 | Data_3 |
| — | — |
| — | — |
| — | — |

TABLE 2

| GUID | Data |
| --- | --- |
| 1001 | Data_1 |
| 1002 | Data_2 |
| 1003 | Data_3 |
| — | — |
| — | — |
| — | — |

TABLE 3

| GUID | LUID |
| --- | --- |
| 1001 | 11 |
| 1002 | 12 |
| 1003 | 13 |
| — | — |
| — | — |

Figure 5A:
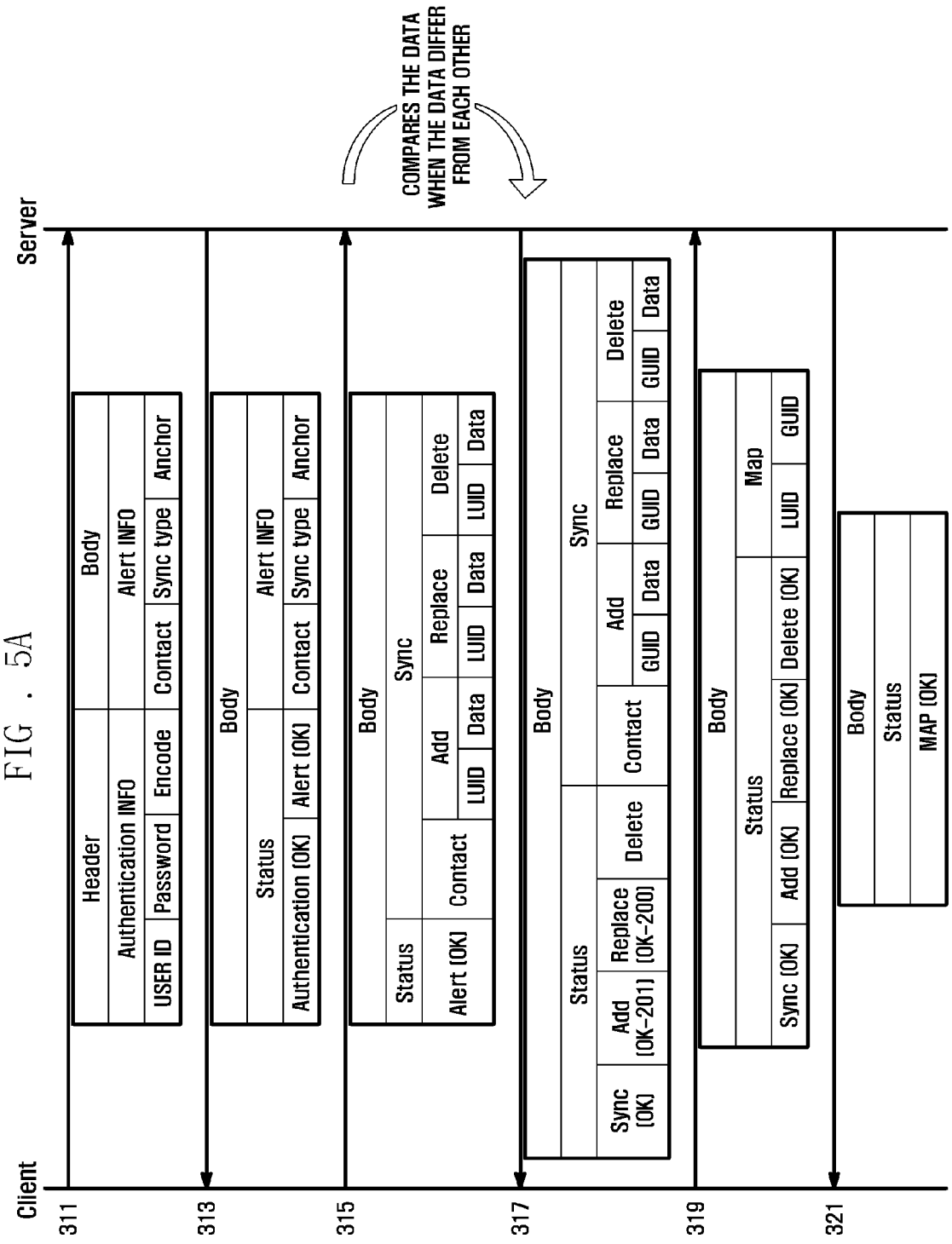

FIGS. 5A and 5B are message flow diagram illustrating data synchronization between a client and a server according to an exemplary embodiment of the present invention. FIG. 5A illustrates the synchronization procedure when the modified data on the client and the server are identical with each other, and FIG. 5B illustrates the synchronization procedure when the modified data on the client and the server differ from each other.

Referring to FIG. 5A, when modification and a data item is detected at the client 200, the client 200 transmits a synchronization request message containing the modified data to the server 100 in step S311. The synchronization request message consists of a header and a body. The header contains authentication information including a user ID and a Password, and the body contains alert information including a sync type and an anchor. The sync type may be one of seven sync types specified in SyncML. The sync types include two-way syncs. The two-way syncs include a fast sync in which the client and the server exchange information regarding the modified data and a slow sync in which all items are compared with each other. In the following, the data synchronization is described in association with the two-way fast sync. Since more than three devices are involved in the data synchronization procedure in this embodiment, the data synchronization method is implemented in an expanded form of the two-way sync. In this case, when modification of any data is detected, either the server 100 or the client 200 creates a synchronization request message and transmits the synchronization request message to a recipient device (server or client) to synchronize their database. In an exemplary implementation, more than three devices including clients and the server are assumed. The anchor information is an element indicating a start and an end of the data synchronization process.

When the synchronization request message is received from the client 200, the server 100 analyzes the authentication information carried by the synchronization request message. If the client 200 is authenticated, the server 100 transmits a synchronization response message to the client 200 in step S313. The synchronization response message carries status information including authentication (OK) indicating authentication success and alert (OK) indicating acceptance of modified data transmission.

Upon receipt of the synchronization response message, the client 200 transmits an update request message. The update request message includes the modification information and the change log. The change log may be a contact (data) or an address book. The sync command of the change log may be any of "add", "replace" and "delete". The synchronization information for adding, replacing or deleting data may include the LUID of data and modified data as well as the change log. That is, the client 200 transmits the change log to the server 100, which the synchronization information of the change log includes the data item to be modified and the LUID assigned by the client.

Upon receipt of the update request message, the server 100 compares the data indicated in the change log carried by an update request message with its corresponding data stored to determine whether the modified data is synchronized. In order to determine whether the modified data is synchronized, the server 100 determines the name of the data item and the creation time of the change log. If the data indicated by the change log differs from the corresponding data (i.e., the modified data is not synchronized), the server 100 updates the information regarding the data in the database to synchronize the databases of the server and the client and to create a modification response message indicating the successful synchronization status in step S317. At this time, the server 100 creates a GUID of the synchronized data item and a mapping of the GUID to the LUID of the client 200 and registers the mapping to the ID map table. Next, the server 100 transmits the modification response message to the client 200. The modification response message may include status information, such as "sync (OK)", modification type, such as "add (OK-201)" and "replace (OK-200)", synchronized data and GUID assigned to the data. That is, the server 100 transmits the status information and synchronization information to the client after updating the data. The status information may be any of addition, deletion and replacement. The synchronization information includes the data item and the GUID assigned to the data item.

If the modification response message is received, the client 200 creates a map request message and transmits the map request message to the server 100 in step S319. The map request message contains status information including status parameters of sync (OK), add (OK) and replace (OK), and a map including a LUID and a GUID. Upon receipt of the map request message, the server 100 creates a mapping between the LUID and the GUID with reference to the map contained in the map request message and then transmits a map response message to the client 200 indicating the map update completion in step S321.

As described above, when a modification of a data item occurs, the client 200 generates a synchronization request message containing the modification information of the data item to the server 100. Upon receipt of the synchronization message, the server 100 determines whether the data item is synchronized already with reference to the name of the data item and/or the creation time of the change log of the data item. If a determination is made that the data item is not synchronized, the server 200 updates the data item and synchronizes the updated data item and the LUID in the database and map table. Next, the server 100 transmits the synchronization response message to the client 200 for notifying of the synchronization of the data base and the map table.

Referring to FIG. 5B, when the modification of a data item indicated by the update request message is already reflected in the corresponding data item (i.e., the modified data item is identical with the corresponding data item registered in the data base), the server 100 may determine the modification update by comparing the names of corresponding data items (and/or the modification times of the data items) in step S315. In this case, the server 100 determines the synchronization of the data item shared with the client 200 and transmits a modification response message indicating that the modification has been reflected already in step S357. Upon receipt of the modification response message, the client 200 transmits an acknowledgement message to the server 100 in step S359. The acknowledgement message contains status information indicating that the modification has been completed in step S359.

As described above, when modification is detected on a data item, the client 200 transmits an update request message indicating the modification to the server 100. Upon receipt of the synchronization request message, the server 100 compares the information regarding the modified data item with the information of the data stored in its database. If the modification of the data item is already reflected in the corresponding data item, the server transmits the modification response message indicating that the data is already synchronized and then ends the synchronization process in step S361.

The server 100 analyzes the information carried by the update request message transmitted by the client 200 and proceeds with the synchronization process when the modification of the data item indicated by the update request message is not reflected in the corresponding data item stored in the server 100. At this time, the server updates the corresponding item and generates a mapping between the LUID and the GUID in the ID map. When the modification of the data item indicated by the update request message is already reflected in the corresponding data item, the server 100 notifies the client 200 that the modification of the data item is already reflected in the corresponding data item and ends the synchronization process.

As described above, the data synchronization method according to an exemplary embodiment of the present invention is efficient, especially when more than three devices are involved in the synchronization process. During the synchronization process, when two of the devices receive the modified data item, the transmitting device updates the corresponding data and records the synchronization result within its database. Next, the transmitting device transmits a synchronization message to other devices in order for the other devices to update the corresponding data item sequentially. In this case, multiple devices receive the identical synchronization message and each device attempts data synchronization per synchronization message. In an exemplary implementation, the device that received a synchronization message determines the modification events of the corresponding data item and synchronizes, when a corresponding data item is not updated with the modification indicated by the synchronization message. The device updates its database and ID map based on the modification information contained in the synchronization message. The device transmits the synchronization message to other devices as shown in FIG. 5A. Otherwise, when the corresponding data item is updated with the modification indicated by the synchronization message, the device transmits to the corresponding device, the synchronization message indicating that the data item is already updated and ends the synchronization process as shown in FIG. 5B.

In the following exemplary embodiment of the present invention, the data synchronization method between three devices is described. In this case, one synchronization server and two clients are assumed as the three devices. Here, one of the two clients has a server function as well as a client function. That is, the client/server acts as a server for synchronizing data with the client. Unlike the case of data synchronization between two devices in which one change log is used, each of the two clients (including the client/server) requires two change logs in the data synchronization among the three devices since the two clients should acquire data synchronization with two devices. In an exemplary implementation, it is assumed that the three devices include a mobile device, a data terminal and a synchronization server. The mobile device may be a mobile phone and the data terminal may be a Personal Computer (PC) which functions as a client and server simultaneously. If a data item is modified at the mobile device or the data terminal, the data item is synchronized among the mobile device, data terminal and synchronization server.

FIGS. 6A to 6D, 7, 8A to 8D and 9 are diagrams illustrating data synchronization procedures when a data item is added and modified at one of three devices according to an exemplary embodiment of the present invention. In the following, the three devices include a web server, a PC and a mobile device. When a data item is synchronized among the three devices, one of the clients has a server function. In an exemplary implementation, the PC has the server function as well as the client function. Each of the server and the clients has change logs corresponding to the number of the other devices. In this embodiment, it is assumed that three devices are involved in the data synchronization. The web server may be referred to as the first server, the PC as the first client and the second server, and the mobile device as the second client.

Each device is provided with two sets of change logs. That is, each device constituting the synchronization network manages a change log per associated device, but does not require a specific format. In this embodiment, it is assumed that each device has change logs as illustrated in Tables 4 to 6 for simplifying the explanation. Table 4 is an exemplary change log table of the PC (server/client), Table 5 is an exemplary change log table of the mobile device (client), and Table 6 is an exemplary change log table of the web server.

TABLE 4

| LUID | Client 2 LUID | Data | Server 1 change log | Client 2 change log |
|------|---------------|------|---------------------|---------------------|
|      |               |      |                     |                     |

TABLE 5

| LUID | Data | Server 1 change log | Server 2 change log |
|------|------|---------------------|---------------------|
|      |      |                     |                     |

TABLE 6

| GUID | Data | Client 1 LUID | Client 2 LUID | Server 1 change log | Client 2 change log |
|------|------|---------------|---------------|---------------------|---------------------|
|      |      |               |               |                     |                     |

FIGS. 6A to 6D and 7 illustrate an added data synchronization procedure of a data synchronization method according to an exemplary embodiment of the present invention.

Figure 6A:
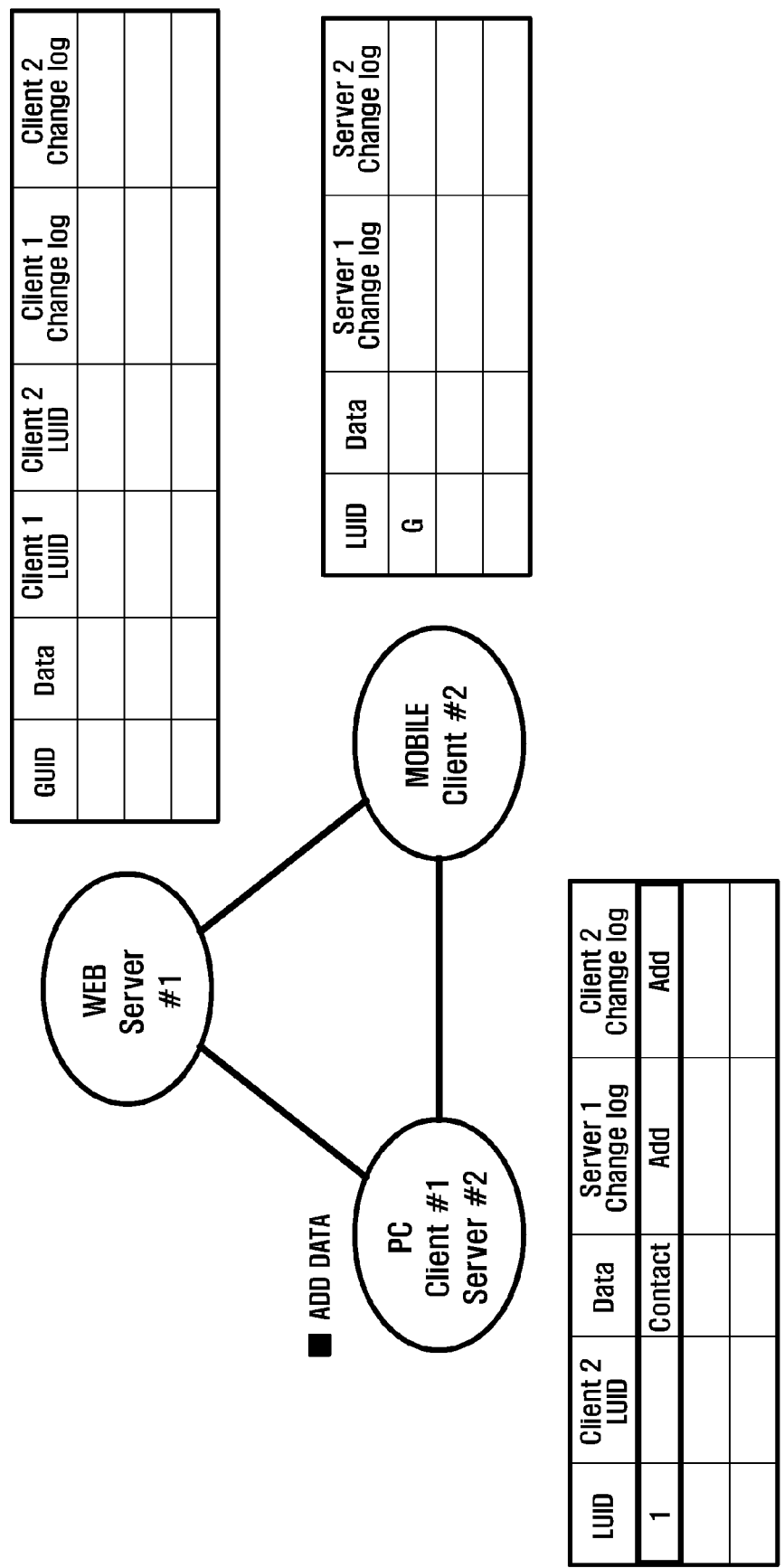
FIGS. 6A to 6D are diagrams illustrating an added data synchronization procedure of a data synchronization method according to an exemplary embodiment of the present invention.
Figure 6B:
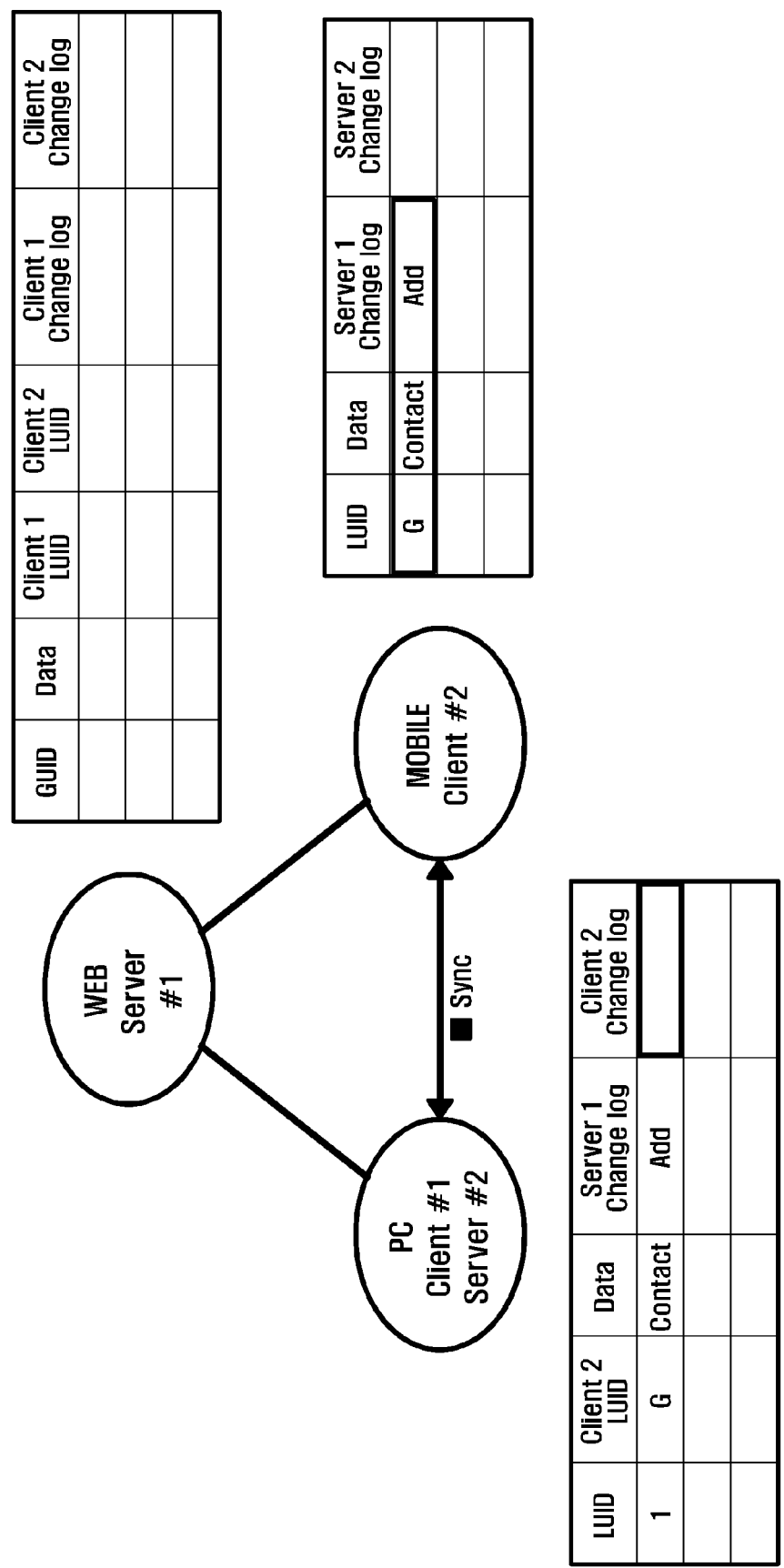

As shown in FIG. 6A, the PC has only one data item at an initial step. The PC has a change log table as illustrated in Table 4 with two change log fields for the respective web server and mobile device. If a data item is added at the PC, the PC generates a local ID and adds the local ID to the change log fields of the change log table. Next, the PC transmits a synchronization request message containing the change log table to the mobile device. If the change log table of the PC is received, the mobile device adds the data item to its change log table with the local ID with reference to the PC's change log table as shown in FIG. 6B. The mobile device's change log table has a server 1 change log field and a server 2 change log field. The mobile device registers the newly added data item with a change log, i.e., command "add". After registering the newly added data item, the mobile device transmits to the PC a synchronization response message containing status information (status: add (OK)) indicating that the mobile device's change log table is synchronized and transmits a synchronization request message to the web server. If the synchronization response message is received, the mobile device deletes the change log information "add" from the client 2 change log field of its change log table (see FIG. 6B). Accordingly, the data item is synchronized between the PC and mobile device.

In the meantime, the web server receives the synchronization request message transmitted by the mobile device and determines whether the data item indicated by the synchronization message exists in its change log table. If the data item does not exist in the server's change log table, the server creates a GUID of the data item and maps the GUID to the client LUID assigned by the mobile device. The server adds the ID mapping (GUID and Client LUID) to its log change table to synchronize with the mobile device's log change table (see FIG. 6C). The record on the data item has a command "add" inserted in the server2/client1 change log field. Next, the web server transmits the mobile device a synchronization response message containing status information (status: add (OK)) indicating that the data item is synchronized.

The web server also receives the synchronization request message transmitted by the PC. If the synchronization request message is received, the web server determines whether the data item indicated by the synchronization request message exists in its log change table. Since the data item is added to the server's log change table according to the synchronization request message transmitted by the mobile device, the web server determines that the data item exists. In this case, the server compares the data item indicated by the synchronization request message from the PC with the data items listed in its change log table. It is determined that the message item indicated by the synchronization request message from the PC exists in its change log table. The web server determines that the data item is synchronized among the PC and mobile device to create a mapping between the GUID assigned by the web server and LUIDs assigned by the clients. The web server deletes the command "add" from the server2/client1 change log field. Next, the web server transmits a synchronization response message indicating the completion of data synchronization to the PC and ends the synchronization process. That is, the web server stops transmission of the data item to the PC and mobile device and ends the data synchronization process.

As described above, when data modification is detected in the log change table, the devices send the modification information to the server. If the modification information is received, the server compares the data item associated with the modification information with the data items listed in its log change table. If the data item indicated by the modification information exist in its log change table, the server transmits to the clients (PC and mobile device) the status information (status code 201) indicating the synchronization of the data item is processed successfully. The server also creates a mapping between the IDs assigned by the server and clients.

Figure 6C:
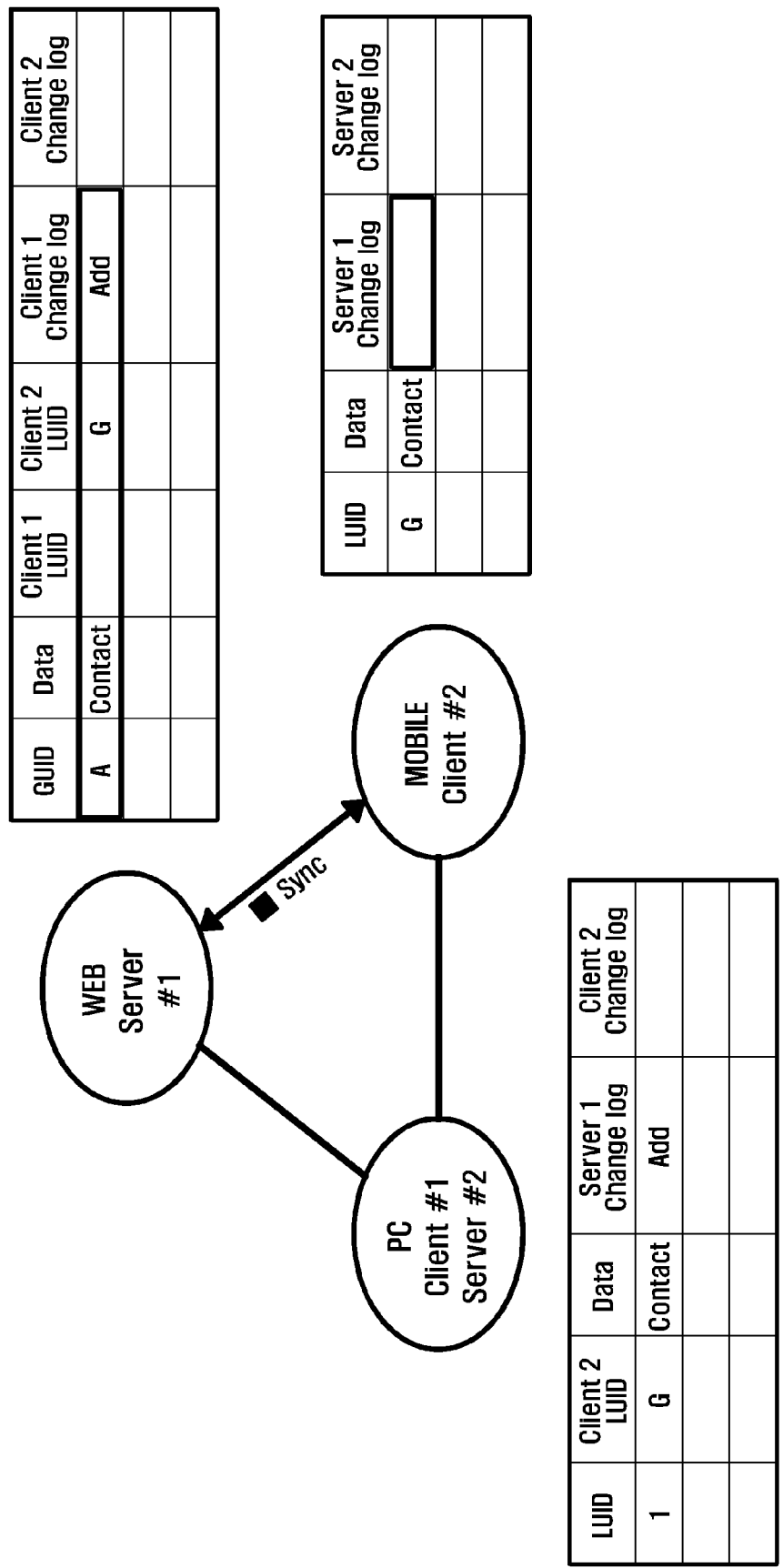
Figure 6D:
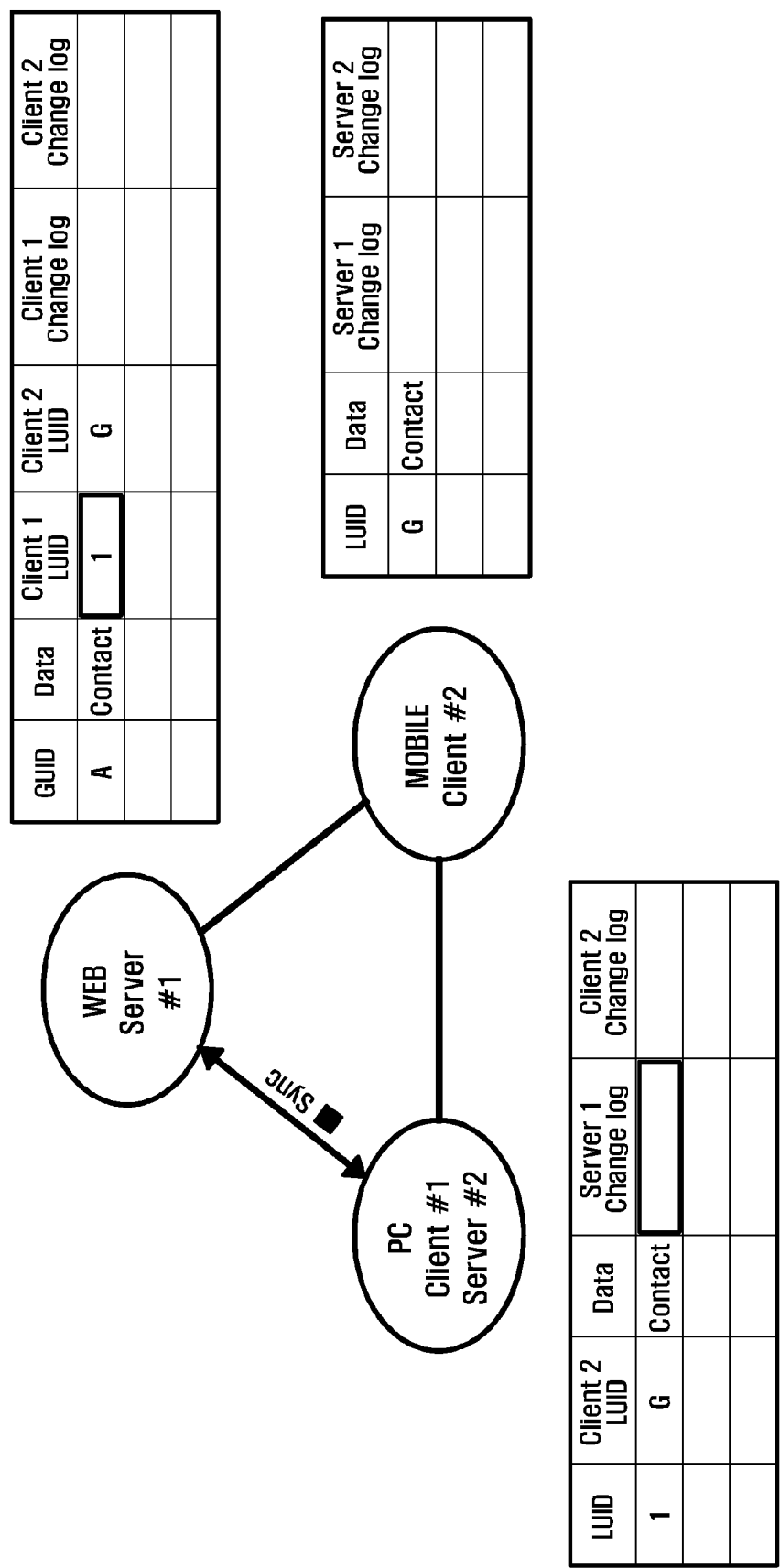

That is, when a data item is added at the PC, the PC transmits a synchronization request message to the web server and mobile device as shown in FIGS. 6B and 6D. The synchronization request message includes the data item (data: "contact") and the LUID "G" assigned by the PC. The mobile device adds the data item carried by the synchronization request message to its log change table to synchronize the data with the PC and transmits the synchronization request message to the web server as shown in FIG. 6C. The synchronization request message transmitted by the mobile device includes the data item (data: "contact") and the LUID "G" registered to its change log table.

The server analyzes the synchronization request messages transmitted by the mobile device and the PC, and performs synchronization of data in its change log table. In this case, the server recognizes that the data item (data: "contact") transmitted by the mobile device is identical with the data item transmitted by the PC. If the data items transmitted by the PC and mobile device are identical with each other, the server transmits the status information indicating that the data item is synchronized in the mobile device already, and adds the LUID ("1") to the client1 LUID field of its change log table. Also, the server deletes the change log (add) from the client1 change log field of its change log table as shown in FIG. 6D. Since the change log is deleted from the records of the data item registered to the change log tables of the three devices (server, PC and mobile device), the devices do not send the synchronization command in association with the data item at the next synchronization process. This means the data item is synchronized among the three devices.

Figure 7:
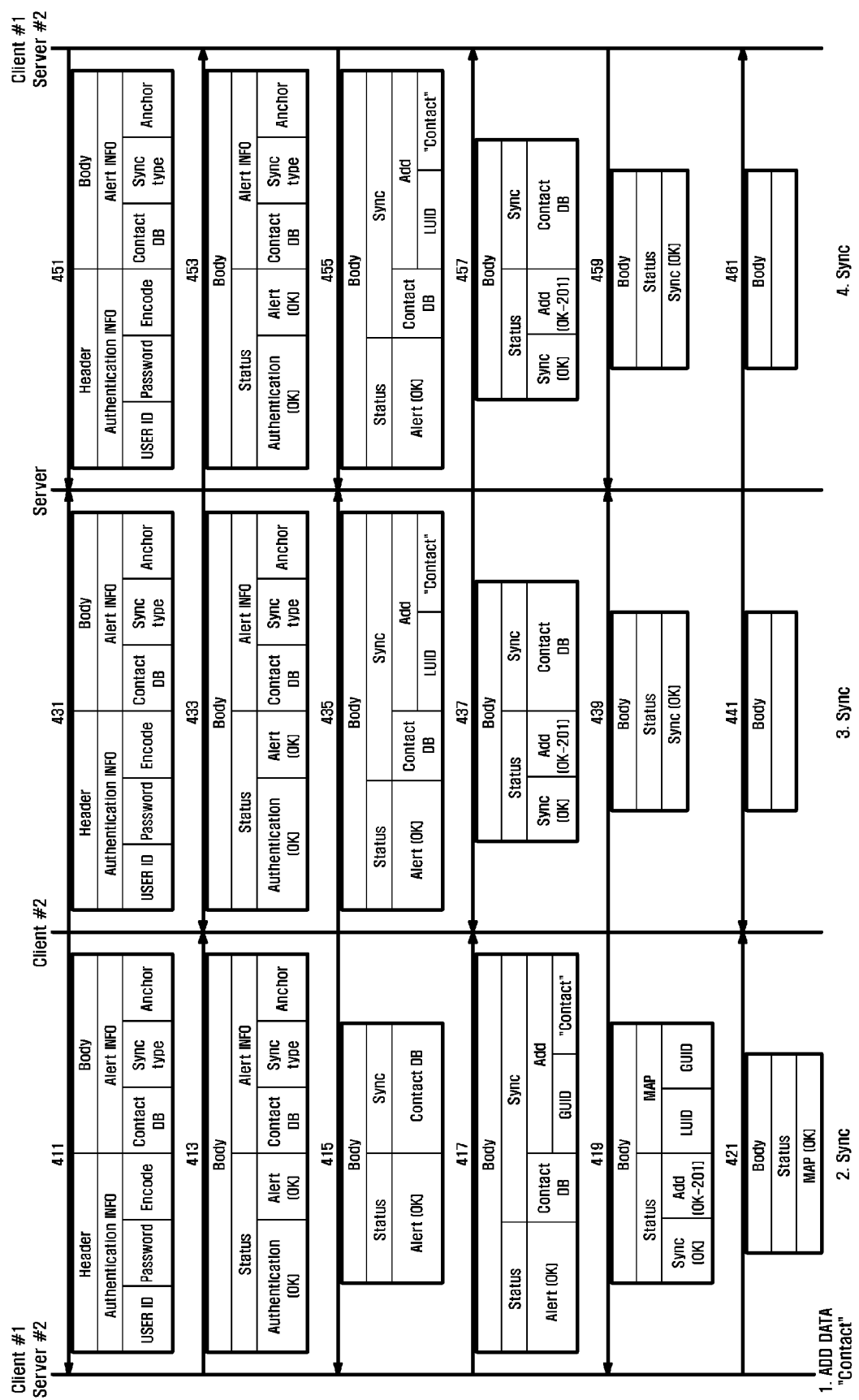
FIG. 7 is a message flow diagram illustrating the added data synchronization procedure according to an exemplary embodiment of the present invention.

FIG. 7 is a message flow diagram illustrating steps of the added data synchronization procedure according to an exemplary embodiment of the present invention. In FIG. 7, a data item is added at the PC and the synchronization procedure is performed between the PC and the mobile device, between the mobile device and the server, and between the server and the PC, sequentially.

Referring to FIG. 7, when a data item is added at the PC which is associated with the mobile device, the client requests authentication in step S411, and the PC approves the authentication in step S413. Next, the mobile device recognizes the authentication approval and notifies the PC of the location of its database in step S415. During the authentication process, the sync type is determined.

Next, the PC generates a change log table including the added data item and transmits the change log table to the mobile device in step S417. If a data item is added, the PC generates a PC ID and transmits the data item ("contact") with the PC ID. At this time, the PC functions as a server (server#2) such that the PC ID is processed as a GUID at the mobile device. Accordingly, the synchronization request message transmitted by the PC includes a command (add), a PC ID (GUID) and the data (contact).

The mobile device adds the data "contact" to its change log table and generates a mobile ID (LUID). Next, the mobile device creates a synchronization response message containing status information (sync (OK) and add (OK-201)) and map information (a mapping between the GUID and the LUID) to transmit to the PC in step S419 to notify the PC that the data item is synchronized in the mobile device. Upon receipt of the synchronization response message, the PC transmits to the mobile device the status information indicating that the synchronization of the data item is acquired in step S421 and ends the data synchronization process.

Regarding synchronization of the data between the mobile device and the server, the mobile device requests authentication to the server in step S431. In response to the authentication request, the server approves the authentication to the mobile device in step S433. Next, the mobile device transmits the synchronization request message containing the data item synchronized and the change log to the server in step S435. Upon receipt of the synchronization request message transmitted by the mobile device, the server compares the change logs of its change log table and the change log extracted from the synchronization request message and determines whether the data item exists based on the comparison result. At this time, the server compares the names of the data items and/or reception times of the data items. If it is determined that there is no identical data item, the server adds the data item to its change log table and creates status information (sync (OK) and add (OK-201)) and transmits the synchronization response message containing the status information in step S437. Upon receipt of the synchronization response message, the mobile device transmits a synchronization confirm message to the server in step S439. In this manner, the synchronization of the data item is acquired between the mobile device and server in step S441.

Regarding synchronization of data between the server and the PC, the PC transmits an authentication request message to the server in step S451, and the server transmits an authentication approval message to the PC in response to the authentication request message in step S453. Upon receipt of the authentication approval message, the PC transmits a synchronization request message containing the data item and the change log on the data item to the server in step S455. If the synchronization request message is received, the server compares the change log contained in the synchronization request message and change logs listed in its change log table and determines whether the identical data item exists according to the comparison result. Since the server has received the data item from the mobile device already, the server generates status information (sync (OK) and add (OK-201)) and transmits the synchronization response message containing the status information to the PC in step S457. Upon receipt of the synchronization response message, the PC transmits a synchronization confirm message to the server in step S459. Accordingly, no more transmission of messages associated with the synchronization of the data item occurs, and the synchronization of the data item is acquired among the three devices in step S461.

FIGS. 6A to 6D and 7 illustrate an exemplary data synchronization procedure when a data item is added at the PC connected to the mobile device. Typically, the devices do not always maintain connections to the server. Accordingly, when the devices are connected to each other, the synchronization of data is performed. For example, when the three devices are connected to each other, the data synchronization procedure is done in a sequential order between the PC and the server, between the PC and the mobile device, and between the mobile device and the server. Here, the server analyzes the change logs of the modified data received from the two other devices, synchronizes the data item corresponding to the data item received first and notifies the device to transmit the data item later, if the data item is synchronized already.

FIGS. 8A to 8D and FIG. 9 illustrate a replaced data synchronization procedure of a data synchronization method according to an exemplary embodiment of the present invention.

Referring to FIGS. 8A to 8D, the replaced data synchronization procedure is similar to the added data synchronization procedure. In an exemplary implementation, the data synchronization procedure is explained under the assumption that a specific data item is replaced in the mobile device.

Figure 8A:
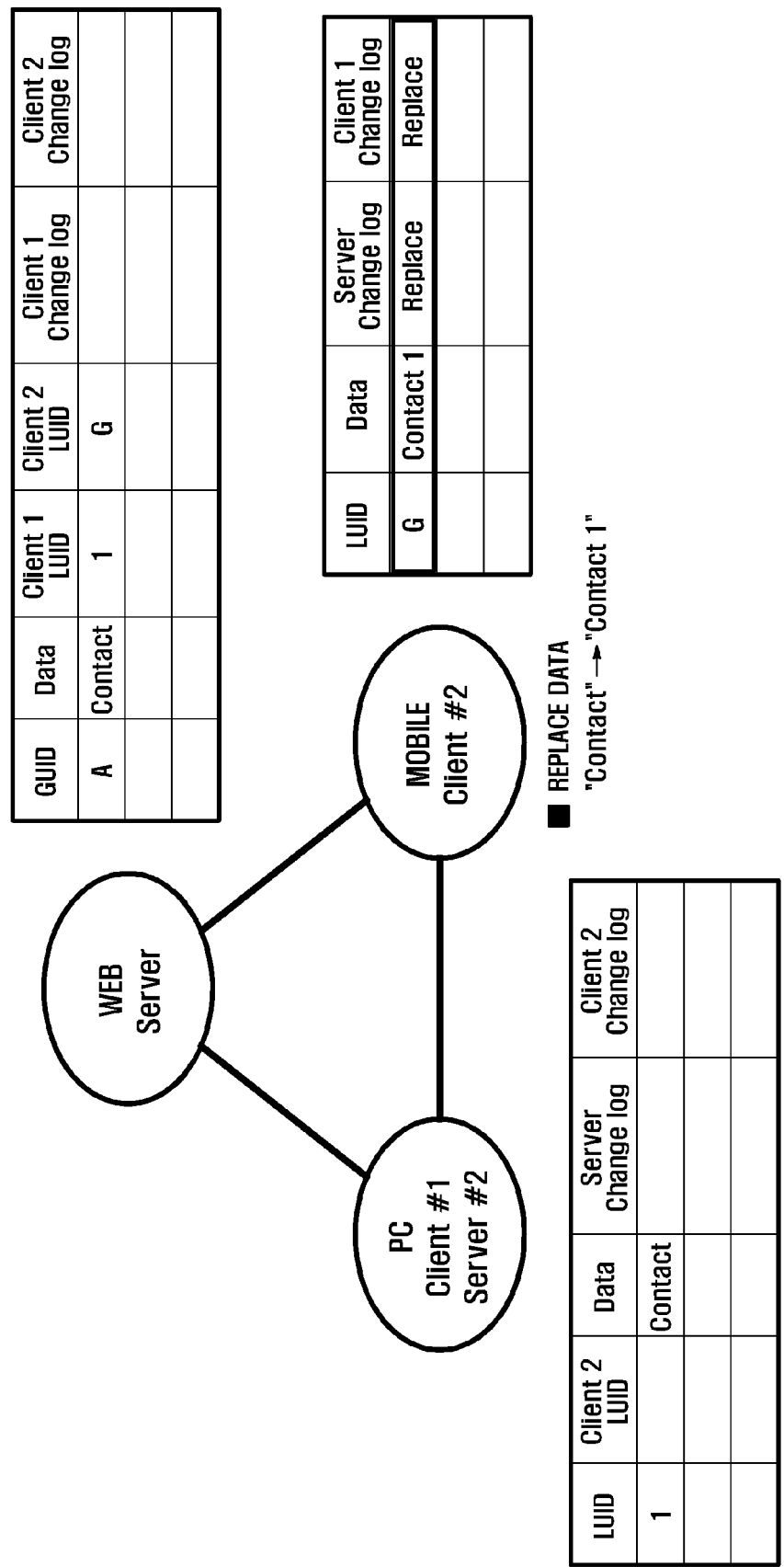
FIGS. 8A to 8D are diagrams illustrating a replaced data synchronization procedure of a data synchronization method according to an exemplary embodiment of the present invention.

In FIG. 8A, the data item "contact" is replaced by "contact 1" at the mobile device. In this case, the mobile device sets the service change log field and client 1 change log field of the record of the data item "contact 1" to a synchronization command "replace".

Figure 8B:
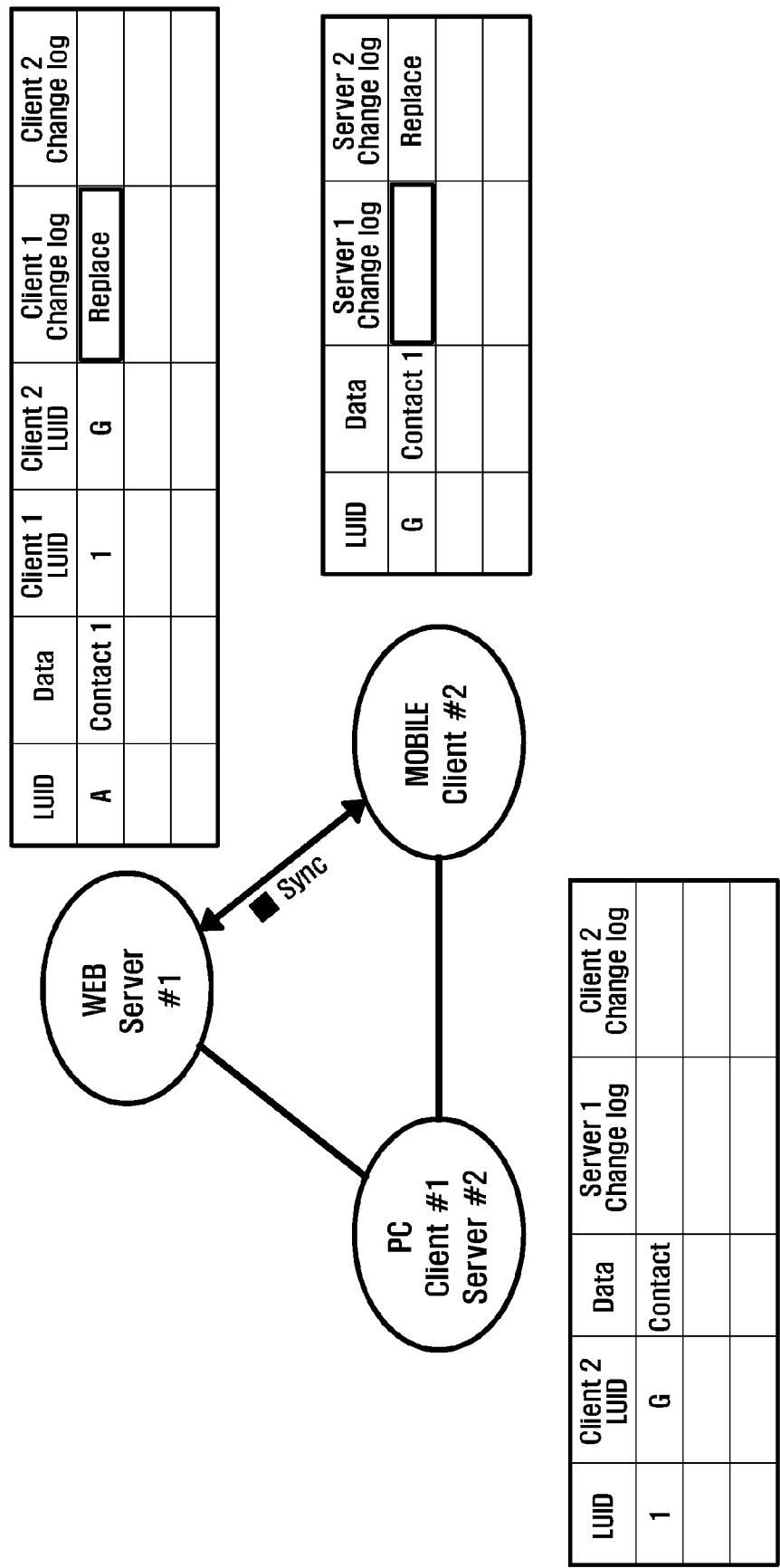

Next, the mobile device attempts synchronization of the modified data item with the server. At this time, the mobile device replaces the data item "contact" with "contact 1" in its change log table, transmits a synchronization request message containing the replaced data item to the server and deletes the synchronization command "replace" from the service 1 change log field of its change log table as shown in FIG. 8B. When the synchronization command contains "replace", the mobile device maintains the data ID rather than assigning another data ID. If the synchronization request message is received, the server analyzes the synchronization request message to replace the data item "contact" with "contact 1" and sets the client 1 (PC) change log field of the record of the replaced data item "contact 1" to "replace".

Figure 8C:
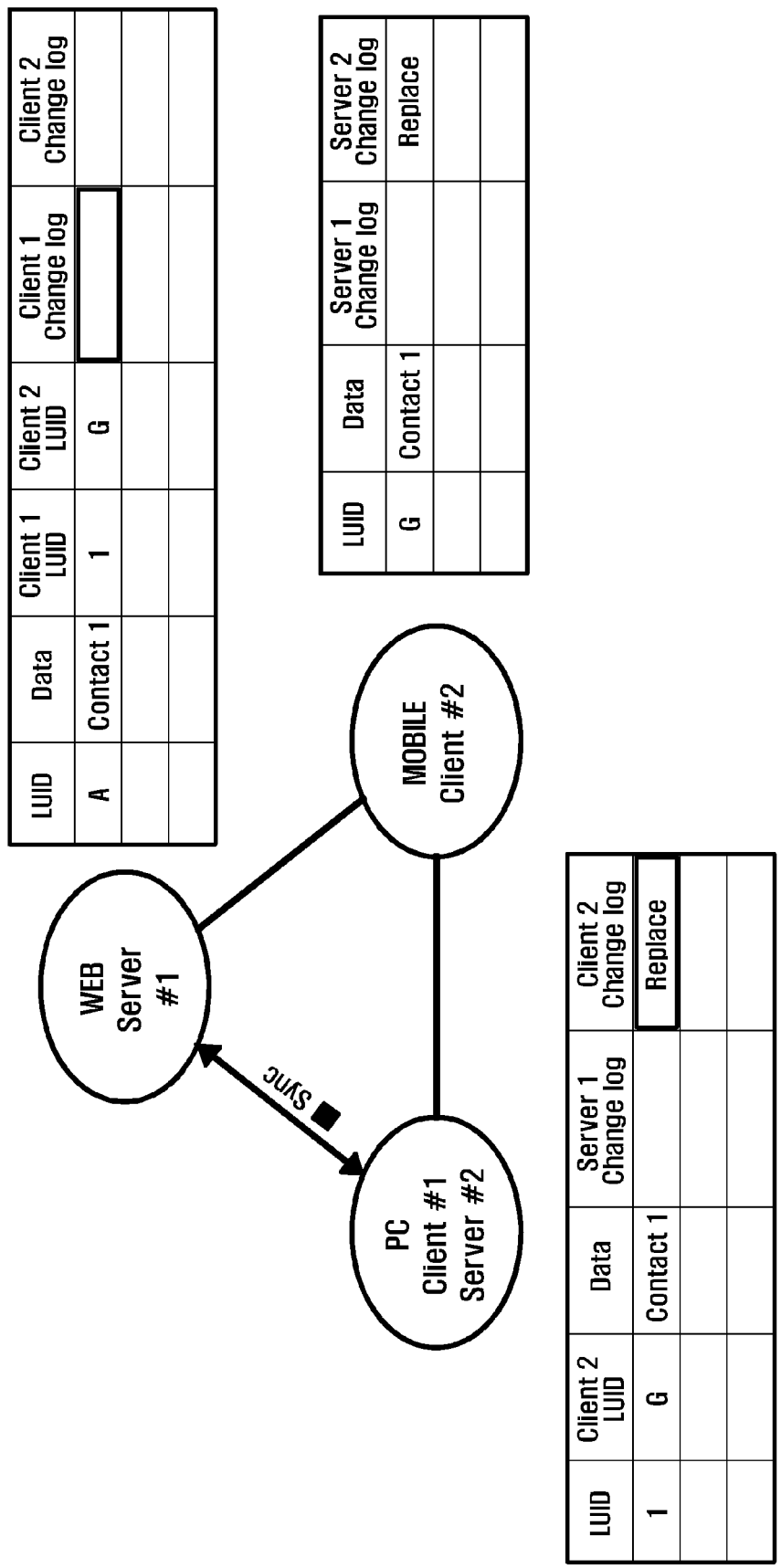

After updating its change log table, the server performs a data synchronization process with the PC. First, the server generates a synchronization request message for replacing the data item "contact" with "contact 1" and deletes the synchronization command "replace" from the client 1 (PC) change log field of the record of "contact 1". Upon receipt of the synchronization request message transmitted by the server, the PC analyzes the synchronization request message to extract the synchronization command "replace", replaces the data item "contact" with "contact 1", and sets the client 2 (mobile device) change log field of the record to "replace" as shown in FIG. 8C.

Figure 8D:
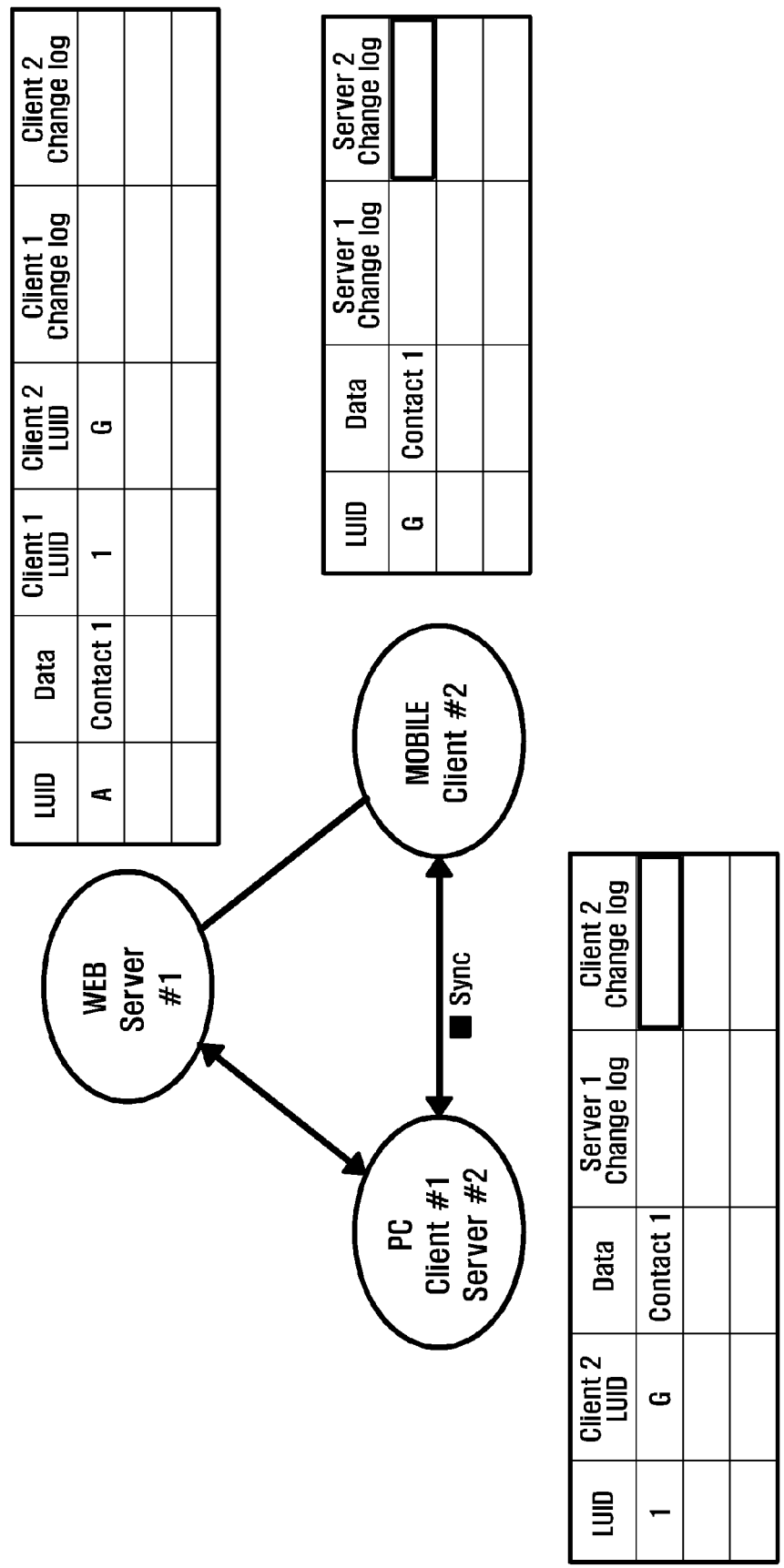

Finally, the mobile device performs replaced data synchronization with the PC. If a synchronization request message is received from the mobile device, the PC analyzes the synchronization request message and performs a data synchronization process based on the analysis result. When the synchronization request message is received from the mobile device, the PC functions as a server. Accordingly, the data item of the PC has been synchronized already in association with the server. The PC recognizes that the replaced data item is identical to the data item received from the mobile device from the comparison result of data names and/or replacement times. In this case, the PC deletes the synchronization command "replace" from the client 2 (mobile device) change log field of its change log table as shown in FIG. 8D and ends the replaced data synchronization process.

As described above, when a data replacement is requested by a client, the server determines whether a data item identified by an LUID transmitted by the client exists in its change log table. If the data item exists in the server's change log table (synchronization of the data item is acquired), the server transmits a response message indicating that the synchronization command is normally executed (in a case of "replace" command, status code 200 is used), and deletes the synchronization command from the change log field of the change log table.

In FIGS. 8A to 8D, the mobile device transmits the replaced data item "contact 1" with an LUID "G", and the server replaces the data item "contact" identified by the LUID "G" with "contact 1". After replacing the data item, the server sets the client 1 (PC) change log field to "replace". Next, the server transmits the replaced data item to the PC. If the replaced data item is received, the PC sets the client 2 (mobile device) change log field of its change log table to "replace" and replaces the data item "contact" with "contact 1". If data synchronization is requested by the mobile terminal afterward, the PC recognizes that the data item is synchronized already and deletes the synchronization command "replace" from the client 2 (mobile device) change log field of its change log table. If the synchronization command is deleted from the change log field of the change log tables of the devices, no more synchronization command is exchanged between the devices. This means that the data item is synchronized among the devices.

Figure 9:
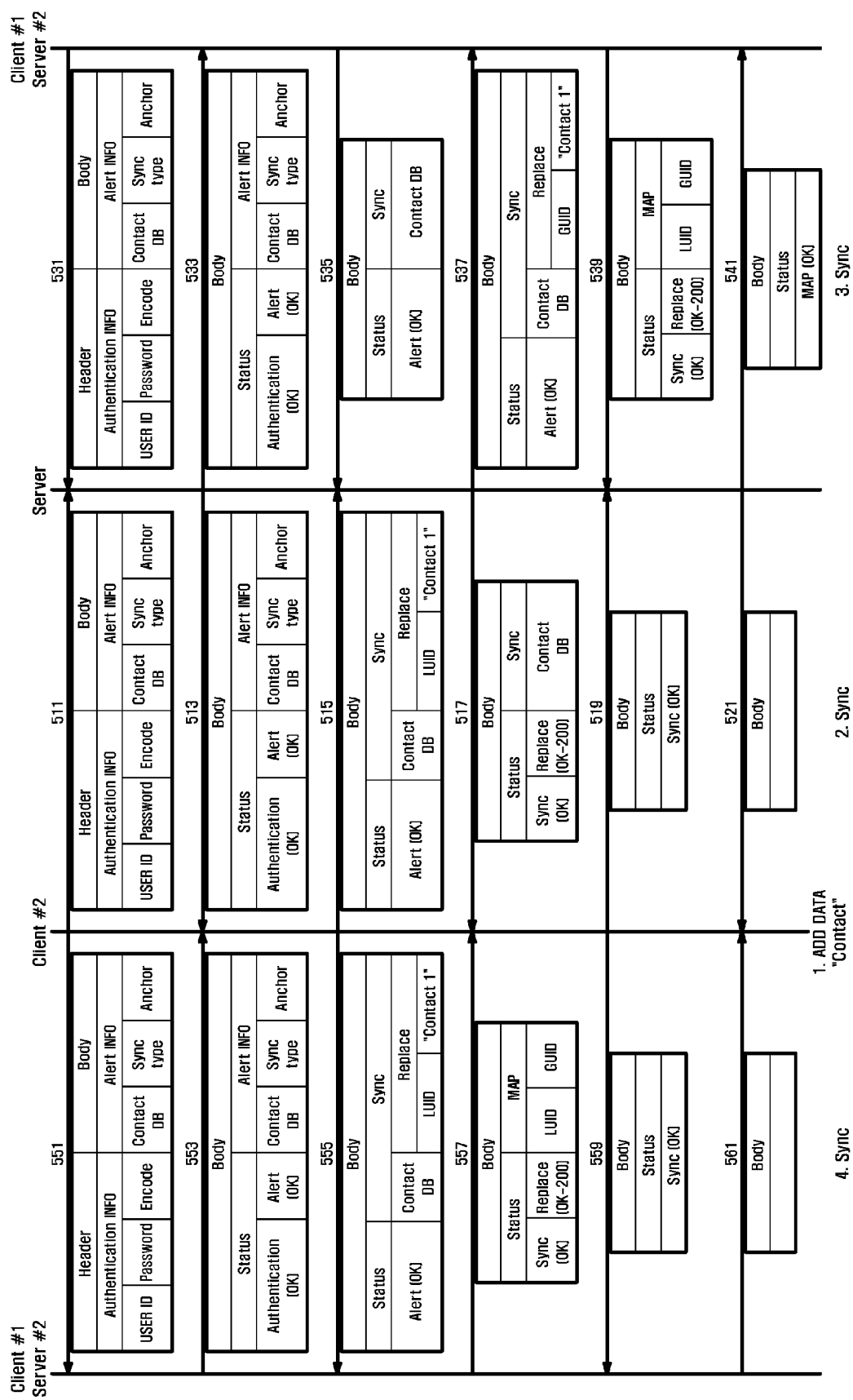
FIG. 9 is a message flow diagram illustrating the replaced data synchronization procedure according to an exemplary embodiment of the present invention.

FIG. 9 is a message flow diagram illustrating the replaced data synchronization procedure according to an exemplary embodiment of the present invention. In FIG. 9, a data item is replaced by another data item at the PC, and the synchronization procedure is performed in a sequential order between the mobile device and the server, between the server and the PC, and the mobile device and the PC.

Referring to FIG. 9, if a data item is replaced at the mobile device which is associated with the server, the mobile device requests authentication to the server in step S511, and the server approves the authentication on the mobile device in step S513. The mobile device recognizes the authentication approval in step S515.

At step S515, the mobile device generates a synchronization request message including a change log and the replaced data item and transmits the synchronization request message to the server. When the data item is replaced, the mobile device creates a data ID (LUID) and transmits the replaced data item ("contact 1") with the LUID. The synchronization request message contains a synchronization command "replace", a data ID (LUID) assigned by the mobile device and the replaced data item "contact 1".

The server replaces the data item "contact" with "contact 1" according to the synchronization command "replace" included in the synchronization request message. Next, the server generates status information (sync (OK) and replace (OK-200)) indicating that the corresponding data item is synchronized and transmits a synchronization response message including the status information to the mobile device in step S517. If the synchronization response message is received, the mobile device transmits a synchronization confirm message containing the status information to the server in step S519.

After the data synchronization is acquired between the mobile device and server in step S521, the PC requests authentication to the server in step S531 and the server approves the authentication request in step S533. If the authentication request is approved, the PC transmits the synchronization request message including location information of its database and transmits the synchronization request message to the server in step S535. If the synchronization request message is received, the server creates a synchronization response message containing the replaced data item and transmits the synchronization response message to the PC in step S537. The synchronization message includes the replaced data item and an ID assigned to the replaced data item by the server. The PC replaces the data item "contact" with "contact 1" with reference to the synchronization response message and transmits a synchronization confirm message indicating that the data item is replaced. The PC also transmits the synchronization confirm message to the server in step S539. In response to the synchronization confirm message, the server transmits to the PC the status information indicating that the data synchronization is acquired in step S541 and ends the data synchronization process.

After the synchronization of the data item between the PC and server, the mobile device transmits an authentication request message to the PC in step S551. In response to the authentication request message, the PC transmits an authentication approval message to the mobile device in step S553. At this time, the PC functions as a server to the mobile device. Next, the mobile device transmits a synchronization request message containing the replaced data item and the change log to the PC in step S555. The PC compares the change log extracted from the synchronization request message with the change logs listed in its change log table and determines whether the replaced data item exists based on the comparison result. Since the replaced data item is already synchronized through the data synchronization process with the server, the PC creates status information (sync (OK) and replace (OK-200)) and transmits a synchronization response message containing the status information to the mobile device for indicating that the replaced data item is synchronized already in step S557. If the synchronization response message is received, the mobile device recognizes the completion of the data synchronization in the PC and transmits a synchronization confirm message to the PC in step S559. In this manner, the replaced data item is synchronized among the three devices in step S561.

FIGS. 8A to 8D and 9 illustrate an exemplary data synchronization procedure when a data item is replaced by another data item at the mobile device. Typically, the devices do not always maintain connections to the server. The replaced data synchronization procedure is similar to the added data synchronization procedure, and the synchronization procedure may be performed between devices associated with each other.

As described above, the data synchronization method of the present invention simplifies synchronization of data among more than three devices, resulting in efficient management. The data synchronization method of the present invention enables synchronizing data among multiple devices efficiently when the data are added and replaced at any of the devices and reduces data transmission amount. Also, the data synchronization method of the present invention is capable of reducing unnecessary data exchanges of large files during the synchronization process, resulting in a reduction of file transmission latency and redundant transmission load.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A data synchronization method for more than three networked devices including at least one client and one server, the method comprising:
    determining whether a data item indicated by synchronization information comprised in a synchronization request message exists in a change log table of the server, when a server receives the synchronization request message transmitted by a first client;
    updating the change log table by adding the data item indicated by the synchronization information and transmitting a synchronization request message comprising a data identifier and change log of the data item to a second client, if a data item indicated by the synchronization information does not exist; and
    ending data synchronization by transmitting a synchronization response message comprising status information to the first client, if a data item indicated by the synchronization information exists,
    wherein the ending of the data synchronization comprises:
    deleting a change log of the data item; and
    creating the synchronization response message comprising the status information which indicates the data item is already synchronized.

2. The method of claim 1, wherein the determining of whether the data item indicated by the synchronization information exists in a change log table comprises comparing a data name and a creation time with data names and creation times listed in the change log table.

3. The method of claim 2, wherein the synchronization information comprises a change log indicating at least one of a modification type of the data item, a modified data and a data identifier.

4. The method of claim 2, wherein the change log comprises at least one of an "add" command and a "replace" command.

5. The method of claim 1, wherein the status information comprises a synchronization status indicating whether synchronization is complete and a change log status indicating whether the change log is executed.

6. The method of claim 3, wherein the change log table comprises a number of change log fields corresponding to a number of associated devices.

7. A data synchronization method for more than three networked devices including at least one client and one server, the method comprising:
    sending a synchronization request message comprising synchronization information from the first device to a second device, when a data item is modified at a first device;
    determining, at the second device, whether the data item indicated by the synchronization information exists in a change log table of the second device;
    updating the change log table by adding the data item, modifying the synchronization information and transmitting a synchronization request message comprising the modified synchronization information to a third device, if the data item does not exist; and
    ending data synchronization by transmitting a synchronization response message comprising status information to the first device, if the data item indicated the synchronization information exists,
    wherein the ending of the data synchronization comprises:
    deleting a change log of the data item; and
    creating the synchronization response message comprising the status information which indicates the data item is already synchronized.

8. The method of claim 7, wherein the synchronization information comprises a change log indicating at least one of a modification type of the data item, a data identifier and a modified data.

9. The method of claim 7, wherein the status information comprises a synchronization status indicating whether synchronization is complete and a change log status indicating whether the change log is executed.

10. The method of claim 8, wherein the change log comprises at least one of an "add" command and a "replace" command.

11. The method of claim 10, wherein the determining of whether a data item indicated by the synchronization information exists in a change log table comprises comparing a data name and a creation time with data names and creation times listed in the change log table.

12. The method of claim 11, wherein the transmitting of the synchronization request message comprising the modified synchronization information to a third device comprises:
    setting a change log associated with the third device in the change log table;
    transmitting a synchronization response message comprising the synchronization status information indicating that the data item is synchronized and synchronization information of the second device; and
    transmitting the synchronization request message comprising the synchronization information of the second device to the third device.

13. A data synchronization method for networked devices including a first device as a server, a second device as a client and a server, and a third device as a client, the method comprising:
    sending a synchronization request message comprising synchronization information associated with modification of the data item from the second device to the first device and the third device, when a data item is modified at the second device;
    updating, at the third device, a change log table reflecting the synchronization information comprised in the synchronization request message and transmitting a synchronization response message comprising the synchronization information with a synchronized data identifier to the first device; determining, at the first device, whether a data item indicated by the synchronization information received from one of the second device and the third device exists in a change log table of the first device;
    updating the change log table, if an identical data item does not exist; and ending data synchronization by transmitting a synchronization response message comprising the synchronization information to the second device,
wherein the ending of the data synchronization comprises:
deleting a change log of the data item; and
creating the synchronization response message comprising the status information which indicates the data item is already synchronized.

14. The method of claim 13, wherein the first device comprises a synchronization server, the second device comprises a computer functioning as the client and the server, and the third device comprises a mobile device functioning as the client.

15. The method of claim 13, wherein the determining of whether the data item exists in the change log table of the first device comprises comparing a data name and a creation time with data names and creation times listed in the change log table.

16. The method of claim 13, wherein the updating of the change log table comprises adding the data item to the third device's change log table, creating status information and transmitting a synchronization response message comprising the status information.

17. The method of claim 13, wherein the synchronization information comprises a change log indicating a modification type of the data item, a modified data and a data identifier.

18. The method of claim 13, wherein the ending of the data synchronization occurs if the data item is already synchronized.

* * * * *